US012158027B2

(12) United States Patent
Grant et al.

(10) Patent No.: US 12,158,027 B2
(45) **Date of Patent: *Dec. 3, 2024**

(54) SMART DEVICE FOR USE WITH AN ELECTRONIC KEY

(71) Applicant: InVue Security Products Inc., Charlotte, NC (US)

(72) Inventors: Jeffrey A. Grant, Charlotte, NC (US); Gary A. Taylor, Fort Mill, SC (US)

(73) Assignee: In Vue Security Products Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,789

(22) Filed: Jun. 5, 2023

(65) Prior Publication Data

US 2023/0313567 A1 Oct. 5, 2023

Related U.S. Application Data

(63) Continuation of application No. 17/582,101, filed on Jan. 24, 2022, now Pat. No. 11,702,867, which is a (Continued)

(51) Int. Cl.
*E05B 73/00* (2006.01)
*G07C 9/00* (2020.01)

(Continued)

(52) U.S. Cl.
CPC ...... *E05B 73/0017* (2013.01); *E05B 73/0047* (2013.01); *G07C 9/00309* (2013.01); *G07C 9/00857* (2013.01); *G07C 9/00896* (2013.01); *E05B 2047/0095* (2013.01); *G07C 2009/00634* (2013.01); *G07C 2009/00769* (2013.01); *G08B 25/008* (2013.01)

(58) Field of Classification Search
None
See application file for complete search history.

(56) References Cited

U.S. PATENT DOCUMENTS

| | | | |
|---|---|---|---|
| 7,737,844 | B2 | 6/2010 | Scott et al. |
| 7,737,846 | B2 | 6/2010 | Belden, Jr. et al. |

(Continued)

FOREIGN PATENT DOCUMENTS

| | | |
|---|---|---|
| JP | 2011064030 | 3/2011 |
| WO | 2011034482 | 3/2011 |

OTHER PUBLICATIONS

"Notification of Transmittal of International Search Report and Written Opinion of the International Searching Authority, or the Declaration" in corresponding International Patent Application No. PCT/US2014/054721; 7 pages.

(Continued)

*Primary Examiner* — K. Wong

(74) *Attorney, Agent, or Firm* — In Vue Security Products Inc.

(57) ABSTRACT

A merchandise security system for protecting an item of merchandise from theft. The merchandise security system comprises a smart device and an electronic key coupled to the smart device. The electronic key is configured to communicate with a merchandise security device for operating a merchandise security device.

22 Claims, 6 Drawing Sheets

Related U.S. Application Data continuation of application No. 17/205,882, filed on Mar. 18, 2021, now Pat. No. 11,230,862, which is a continuation of application No. 16/871,837, filed on May 11, 2020, now abandoned, which is a continuation of application No. 16/122,497, filed on Sep. 5, 2018, now abandoned, which is a continuation of application No. 15/021,002, filed as application No. PCT/US2014/054721 on Sep. 9, 2014, now abandoned.

(60) Provisional application No. 61/878,739, filed on Sep. 17, 2013.

(51) Int. Cl.
*E05B 47/00* (2006.01)
*G08B 25/00* (2006.01)

(56) References Cited

U.S. PATENT DOCUMENTS

| | | | | |
|---|---|---|---|---|
| 7,904,113 | B2 | 3/2011 | Ozluturk et al. | |
| 8,754,609 | B2 | 6/2014 | Tsai et al. | |
| 8,774,714 | B2 | 7/2014 | Metivier | |
| 8,860,574 | B2 | 10/2014 | Grant et al. | |
| 8,994,497 | B2 | 3/2015 | Grant et al. | |
| 9,428,938 | B2 | 8/2016 | Taylor et al. | |
| 9,742,222 | B1 | 8/2017 | Xu et al. | |
| 10,282,930 | B2 | 5/2019 | Borg et al. | |
| 10,378,239 | B2 | 8/2019 | Avganim | |
| 11,230,862 | B2 | 1/2022 | Grant et al. | |
| 11,702,867 | B2 * | 7/2023 | Grant | E05B 73/0017 70/14 |
| 2004/0025039 | A1 | 2/2004 | Kuenzi et al. | |
| 2007/0131005 | A1 | 6/2007 | Clare | |
| 2007/0144224 | A1 | 6/2007 | Scott et al. | |
| 2007/0146134 | A1 | 6/2007 | Belden et al. | |
| 2007/0159328 | A1 | 7/2007 | Belden et al. | |
| 2012/0047972 | A1 | 3/2012 | Grant et al. | |
| 2013/0237193 | A1 | 9/2013 | Dumas et al. | |
| 2013/0257589 | A1 | 10/2013 | Mohiuddin et al. | |
| 2014/0326027 | A1 | 11/2014 | Avganim | |
| 2016/0222699 | A1 | 8/2016 | Grant et al. | |
| 2018/0363332 | A1 | 12/2018 | Grant et al. | |
| 2019/0003209 | A1 | 1/2019 | Grant et al. | |
| 2020/0270910 | A1 | 8/2020 | Grant et al. | |
| 2021/0207408 | A1 | 7/2021 | Grant et al. | |
| 2022/0145671 | A1 | 5/2022 | Grant et al. | |

OTHER PUBLICATIONS

Extended European Search Report from corresponding European Application No. 14845137.0, dated Jul. 24, 2017 (11 pages).

Partial Supplementary European Search Report from corresponding European Application No. 14845137.0, dated Feb. 16, 2017 (6 pages).

* cited by examiner

SMART DEVICE FOR USE WITH AN ELECTRONIC KEY

CROSS REFERENCE TO RELATED APPLICATIONS

The present application is a continuation of and claims the benefit of priority to U.S. application Ser. No. 17/582,101, filed on Jan. 24, 2022, which is a continuation of U.S. application Ser. No. 17/205,882, filed on Mar. 19, 2021, now U.S. Pat. No. 11,230,862, which is a continuation of U.S. application Ser. No. 16/871,837, filed on May 11, 2020, which is a continuation of U.S. application Ser. No. 16/122,497, filed on Sep. 5, 2018, which is a continuation of U.S. application Ser. No. 15/021,002, filed on Mar. 10, 2016, which is a 371 National Stage Application of International Application No. PCT/US2014/054721, which claims the benefit of the filing date of U.S. Provisional Application No. 61/878,739, filed on Sep. 17, 2013, the disclosures of which are incorporated herein by reference in their entireties.

FIELD OF THE INVENTION

Embodiments of the present invention relate generally to devices and methods for protecting an item of merchandise from theft. More particularly, embodiments of the present invention relate to smart devices configured for use with an electronic key.

BACKGROUND OF THE INVENTION

It is common practice for retailers to display relatively small, expensive items of merchandise on a security device, such as a display hook or a display fixture, within security packaging commonly referred to as a "safer", or otherwise on a display surface. The security device displays an item of merchandise so that a potential purchaser may examine the item when deciding whether to purchase the item. The small size and relative expense of the item, however, makes the item an attractive target for shoplifters. A shoplifter may attempt to detach the item from the security device, or alternatively, may attempt to remove the security device from the display area along with the merchandise. Items of merchandise may also be secured using a display stand to allow users to sample the item for potential purchase. In some instances, the security device is secured to a display support using a lock operated by a key, for example, a mechanical lock. In other instances, the security device is secured to the display support using a lock operated by an electronic key to arm and disarm the security device.

BRIEF SUMMARY

Embodiments of the present invention are directed to merchandise security systems for protecting an item of merchandise from theft. In one example, the merchandise security system includes a smart device and an electronic key coupled to the smart device and configured to communicate with a merchandise security device for operating the merchandise security device.

In one embodiment, a merchandise security system includes a smart device and an electronic key electrically coupled to the smart device. The merchandise security system also includes a merchandise security device. The electronic key is configured to communicate with the merchandise security device for operating the merchandise security device.

In another embodiment, a method for protecting an item of merchandise susceptible to theft is provided. The method includes coupling an electronic key to a smart device and actuating the smart device or the electronic key to communicate with a merchandise security device for operating the merchandise security device.

BRIEF DESCRIPTION OF THE DRAWINGS

The detailed description of the invention provided below may be better understood with reference to the accompanying drawing figures, which depict one or more embodiments of a security device and method.

DETAILED DESCRIPTION OF EMBODIMENTS OF THE INVENTION

Figure 1:
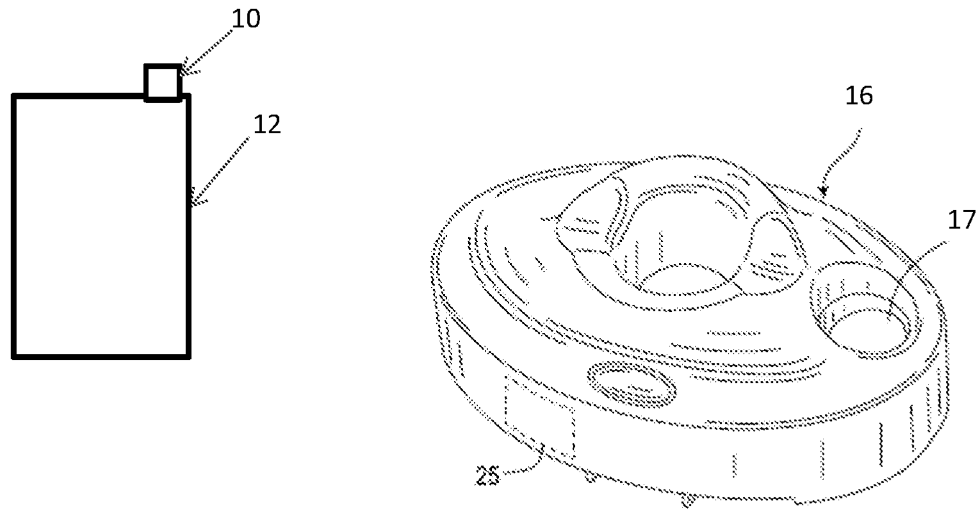
FIG. 1 is a schematic of a merchandise security system according to one embodiment of the present invention.

Referring now to the accompanying drawing figures wherein like reference numerals denote like elements throughout the various views, one or more embodiments of a merchandise security system are shown. In the embodiments shown and described herein, the security system includes an electronic key 10 and a smart device 12. The electronic key 10 and smart device 12 are suitable for use with merchandise security devices 16 such as, for example, a security display (e.g. alarming stand or module), security fixture (e.g. locking hook, shelf, cabinet, etc.), security wraps or cables, garment tags, or security packaging (e.g. merchandise safer) for protecting an item of merchandise from theft. FIG. 1 shows one embodiment of an alarming stand configured to communicate with the smart device 12 and/or the electronic key 10 for arming and/or disarming the alarming stand. In some embodiments shown and described herein, the merchandise security device 16 is a locking hook configured to be unlocked by the electronic key 10. However, the electronic key 10 may be useable with any security device 16 that utilizes power transferred from the key to operate a lock mechanism associated with the security device and/or utilizes data transferred from the key to authorize the operation of a lock mechanism. It is understood that the term "lock mechanism" is not intended to be limiting and may include any mechanism (e.g., a mechanical lock), circuit (e.g., an alarm circuit), or the like that is configured to be locked, unlocked, armed, and/or disarmed via communication with an electronic key. In other words, an electronic key 10 according to embodiments of the invention is useable with any security device 16 or lock mechanism that requires power transferred from the key to the device and/or data transferred from the key to the device. Further examples of security devices 16 include, but are not limited to, a door lock, a drawer lock or a shelf lock, as well as any device that prevents an unauthorized person from accessing, removing or detaching an item from a secure location or position. It should be noted that although the invention is described with respect to embodiments including an electronic key 10 for transferring both data and electrical power to a merchandise security device 16 to operate a merchandise security device 16 (e.g., a mechanical lock mechanism), the invention is equally applicable to an electronic key for transferring only electrical power to a merchandise security device to operate any component of the merchandise security device (e.g., a lock mechanism), whether or not the device includes an internal or external power source for operating another component of the device.

The term "smart device", as used herein is not meant to be limiting and may be any electronic device suitable for interfacing with an electronic key 10 as described in further detail below. In some embodiments, a smart device 12 is a smart phone (e.g., an iPhone®), a cellular telephone, a tablet (e.g., an iPad®), or the like. The smart device 12 may include one or more components known to those skilled in the art, such as, for example, a housing, a processor disposed within the housing, a display coupled to the housing, a power source (e.g., a battery) for powering the device, wireless communication functionality, memory, SIM card, SM card, a near field communication (NFC) tag, camera, etc.

In some embodiments, the smart device 12 is configured to transfer power from the smart device to the electronic key 10 for communicating with a merchandise security device 16 (e.g., electrical communication). The electronic key 10 may be configured to transfer electrical power to a merchandise security device 16 to arm, lock, disarm, and/or unlock the merchandise security device. Thus, the electronic key 10 may be "passive" and not require an internal source of power such as a battery and may rely on a power source associated with the smart device 12, such as an internal battery. In one example, the electronic key 10 may not otherwise be operable unless the electronic key is coupled to the smart device 12. As such, actuating the key 10 may facilitate power transfer from the smart device 12 to the electronic key. Likewise, the merchandise security device 16 may be passive and also not require a source of power as described in greater detail below. However, it is understood that the electronic key 10 may include a power source (e.g., a battery) and be an "active" device in other embodiment. Thus, the electronic key 10 may be coupled to the smart device 12 and be configured to transfer power to the merchandise security device 16.

In some instances, the smart device 12 may include a software application that is configured to facilitate power transfer to the electronic key 10. For example, the smart device 12 may utilize USB "on-the-go" or like functionality for facilitating power transfer from the smart device 12 to the electronic key 10. Therefore, the smart device 12 may be configured to provide power to a merchandise security device 16 via the electronic key 10.

Figure 2A:
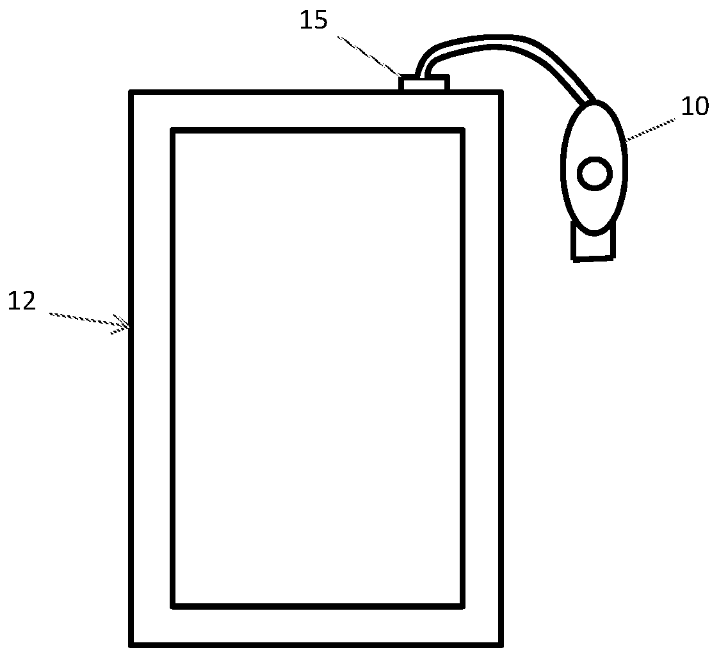
FIG. 2A is a schematic of a merchandise security system according to another embodiment of the present invention.
Figure 2B:
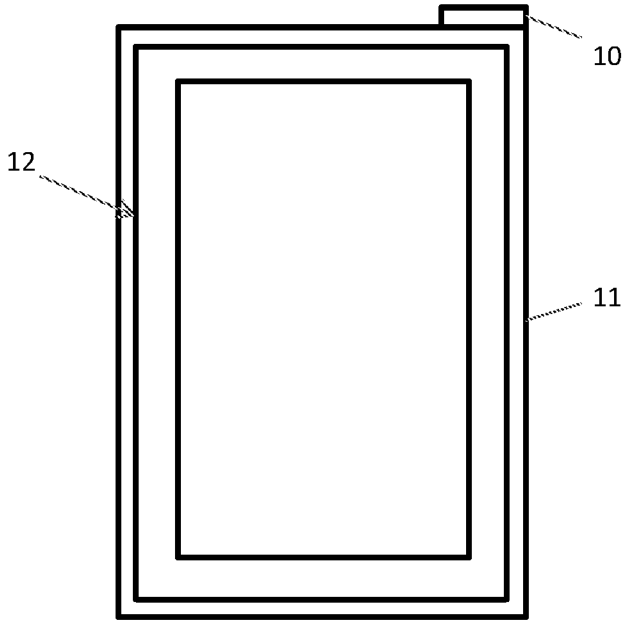
FIG. 2B is a schematic of a merchandise security system according to another embodiment of the present invention.

In one embodiment, the electronic key 10 is coupled to the smart device 12. For example, the electronic key 10 may be removably attached to the smart device 12 (see, e.g., FIG. 2A). In other embodiments, the electronic key 10 may be attached to or integrated with a shroud 13 that this in turn attached to the smart device 12 (see FIG. 2B). Thus, the shroud 13 could function as a protective case as well as provide functionality for operating the electronic key 10. The shroud 13 could include an actuation member that is configured to cooperate with the electronic key 10 for operating the key. In one example, the electronic key 10 may be electrically coupled to the smart device 12. For instance, FIGS. 1 and 2A show that the electronic key may be coupled to an input port 15 of the smart device 12 (e.g., a headphone jack), such as via a cable connector or a direct connection. Of course, other connections between the smart device 12 and the electronic key 10 are possible, such as using a dongle or an adapter for electrically coupling the electronic key to the smart device. In another example, the smart device 12 is configured to control the electronic key 10. In other words, a user could interface with the smart device 12 to operate the electronic key 10 rather than having to interact with the key itself. As such, the smart device 12 could be programmed to operate the electronic key 10, such as by interacting with a user interface associated with the smart device. In addition, further security could be implemented with the smart device 12, such as requiring a user to input a password into the smart device before the electronic key 10 can be operated.

Figure 3:
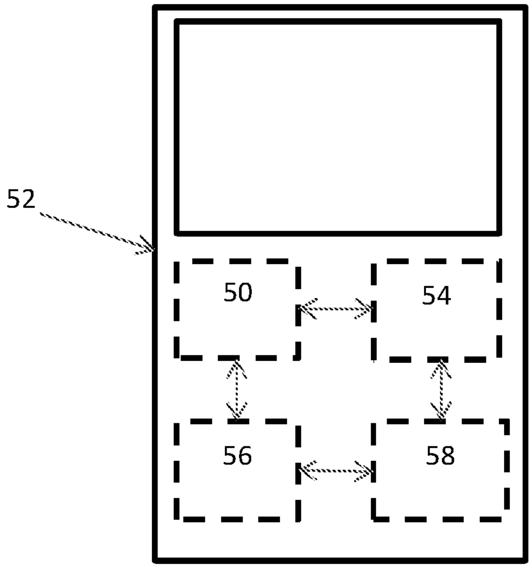
FIG. 3 is a schematic of a merchandise security system according to another embodiment of the present invention.

In another embodiment, the smart device 12 and the electronic key 10 may be integrated with one another. For example, FIG. 3 shows an example of a smart device 52 including an electronic key 50, a power source 54 (e.g., a battery), an interface 56, and a communications system 58. The electronic key 50 in this instance may be a logic control circuit programmed or otherwise configured to operate as an electronic key. Thus, the smart device 52 may be configured to perform the functionality of the electronic key 10. For example, the smart device 52 may be programmed to allow the smart device to communicate with a merchandise security device 16. An authorized user of the smart device 52 could interact with the smart device (e.g., via a user interface) to communicate with a merchandise security device 16. In another embodiment, the electronic key 50 is a near field communication (NFC) tag that is configured to communicate with an NFC tag associated with the merchandise security device 16.

Moreover, the smart device 12 and/or electronic key 10 may be configured to communicate with each other and the merchandise security device 16 using various wireless communication techniques, such as, for example, WiFi, Bluetooth, inductive transfer, electrical contacts, and near field communication (NFC). For example, the smart device 12 and the electronic key 10 may each include an NFC tag configured to communicate with one another. Likewise, the merchandise security device 16 may include one or more NFC tags for communicating with one or more NFC tags associated with the smart device 12 and/or electronic key 10. In the case of inductance, the smart device 12 may include a coil for transferring power to a coil associated with the electronic key 10 (e.g., using the Qi Standard). The concept of inductive transfer between the electronic key 10 and the merchandise security device 16 is discussed below, and similar inductive transfer could take place between the smart device 12 and the electronic key. In other examples, the smart device 12 and/or electronic key 10 may be configured to communicate using various wired means, such as a wired connection (see FIG. 2A).

One embodiment of a merchandise display system according to the invention is illustrated in FIG. 1. The embodiment of the merchandise display security system depicted comprises a smart device 12 coupled to an electronic key 10 and a merchandise security device 16 that is configured to be operated by the key. The security device 16 may include a transfer port 17 for communicating with the electronic key 10, as explained in further detail below. The system may further comprise an optional programming station that is operable for programming the electronic key 10 with a security code, which is also referred to herein as a Security Disarm Code (SDC). A programming station suitable for use with the present invention is shown and described in detail in U.S. Pat. No. 7,737,844 entitled Programming Station For a Security System For Protecting Merchandise, the disclosure of which is incorporated herein by reference in its entirety. It is understood that in other embodiments, the electronic key 10 may be programmed without use of a programming station. For example, the key 10 may be self-programming, pre-programmed with a particular security code, manually programmed by a user, or programmed by the smart device 12.

In the case where the electronic key 10 includes a power source, a charging station may be utilized to power the electronic key. In the case where the electronic key 10 does not include a power source, the system does not require a charging station that is operable for initially charging and/or subsequently recharging a power source disposed within the key. In some embodiments, the smart device 12 may be provisioned with a single-use (i.e. non-rechargeable) power source, such as a conventional or extended-life battery, or alternatively, the smart device may be provisioned with a multiple-use (i.e. rechargeable) power source, such as a conventional capacitor or rechargeable battery. In either instance, the power source may be permanent, semi-permanent (i.e. replaceable), or rechargeable, as desired.

According to various embodiments, the electronic key 10 and the merchandise security device 16 are "passive" devices. As used herein, the term passive is intended to mean that the electronic key 10 and the merchandise security device 16 do not have an internal power source (e.g., a battery). Significant cost savings are obtained by a retailer when the electronic key 10 and the merchandise security device 16 are passive since the expense of an internal power source is confined to the smart device 12, and one such smart device is able to operate multiple security devices. In addition, the security device 16 may not require an electric motor, such as a DC stepper motor, solenoid, or the like, that is configured to lock or unlock a lock mechanism. As such, the security device 16 may employ a simplified lock mechanism that does not require various components operated by its own source of electrical power.

Moreover, in some embodiments the merchandise security device 16 is not required to include a logic control circuit, while the electronic key 10 includes such a logic control circuit. In this regard, some security devices 16 include a logic control circuit adapted to perform a handshake communication protocol with the logic control circuit of the key 10 (e.g., using an SDC). Thus, the security device 16 may not include a logic control circuit used to communicate with the electronic key 10 in order to determine whether the merchandise security device is an authorized device. Likewise, the electronic key 10 may also not include a logic control circuit. Regardless of whether the electronic key 10 includes a logic control circuit, an SDC may be unnecessary where the electronic key is configured to transmit power to the security device 16 that is not readily duplicated by a potential thief. For example, where the electronic key 10 is configured to transmit power inductively, the inductive signature may provide increased security relative to conventional mechanical locks that utilize mechanical or magnetic actuators. For example, the electronic key 10 may be configured to transmit an inductive signature including a particular amplitude and/or frequency of a power signal that is not readily apparent to, or duplicated by, a potential thief.

In one embodiment, the electronic key 10 does not transmit an SDC to the security device 16. However, in other embodiments, the electronic key 10 may be configured to transmit an SDC to the security device 16. In this example, the security device 16 may include a corresponding SDC. Thus, the electronic key 10 may be configured to perform a handshake communication protocol with the security device 16. Where the SDC of the electronic key 10 matches the SDC of the security device 16, the electronic key may then be configured to transmit electrical power to the security device.

However in other embodiments, the security device 16 may not recognize the SDC transmitted by the electronic key 10, such as where the security device does not include a logic control circuit or a component including an SDC. If the electronic key 10 does not receive a return signal from the security device 16, the electronic key may then transmit electrical power to the security device as described in further detail below. Thus, although the electronic key 10 may transmit an SDC to the security device 16, the security device may not recognize the SDC and the SDC will not affect the operation of the security device. As will be readily apparent to those skilled in the art, the SDC may be transmitted from the electronic key 10 to the merchandise security device 16 by any suitable means, including without limitation, via one or more electrical contacts, or via optical, acoustic, electromechanical, electromagnetic or magnetic conductors, as desired. Furthermore, the SDC may be transmitted by inductive transfer of data from the electronic key 10 to the merchandise security device 16.

In one embodiment, the logic control circuit of the key 10 is configured to cause the key to transfer electrical power to the security device 16 to operate a lock mechanism of the security device. In one embodiment, electrical contacts disposed on the electronic key 10 electrically couple with cooperating electrical contacts on the merchandise security device 16 to transfer power from the internal battery of the smart device 12 to the merchandise security device. Alternatively, the key 10 may include a power source for transferring power to the merchandise security device 16. Power may be transferred directly to the lock mechanism via one or more conductors. For example, a conductor may be coupled to a mechanical lock mechanism, and when electrical power is conducted through the conductor, a state change occurs thereby resulting in operation of the lock mechanism. In one example, the conductor is coupled to a shape memory material (e.g., Nitinol) such that electrical power transferred through the conductor results in a change in shape of the shape memory material. Such a change in shape may cause a mechanical actuation (e.g., linear or rotary) of the lock mechanism to thereby lock or unlock the lock mechanism. Examples of using such shape memory material for a lock mechanism may be found, for example, in U.S. application Ser. No. 14/328,051, filed on Jul. 10, 2014, which is hereby incorporated by reference in its entirety. In other embodiments, the lock mechanism may cooperate with a motor or solenoid for operating the lock mechanism.

An available feature of a merchandise security system and method according to an embodiment of the invention is that the smart device 12 and/or the electronic key 10 may include a time-out function. More particularly, the ability of the smart device 12 and/or the key 10 to transfer data and/or power to the merchandise security device 16 is deactivated after a predetermined time period. By way of example, the logic control circuit of the key 10 may be deactivated after about six to twelve hours (e.g., about eight hours) from the time the key was programmed or last refreshed by the programming station. In this manner, an authorized sales associate typically must program or refresh the key assigned to him at the beginning of each work shift. Furthermore, the smart device 12 may be configured to deactivate the logic control circuit of the key 10 after a predetermined period of time. Similarly, the smart device 12 may be deactivated after a predetermined period of time such that the smart device would require a password or the smart device and/or electronic key 10 would need to be refreshed or programmed.

The security device 16 may include a transfer port 17 sized and shaped to receive a transfer probe of the electronic key 10 (see FIG. 1). At least one, and sometimes, a plurality of magnets may be disposed within the transfer port for securely positioning and retaining the transfer probe of the key 10 in electrical contact with electrical contacts of the mechanical lock mechanism. Power is transferred from the electronic key 10 to the security device 16 through electrical contacts disposed on the transfer probe of the key and corresponding electrical contacts disposed within the transfer port of the security device.

FIGS. 4-7 show an embodiment of an electronic key 20. As previously mentioned, the electronic key 20 is configured to transfer power and/or data to a merchandise security device 16 that comprises a lock mechanism. The smart device 12 may be configured to transfer power to the electronic key 20 as described above. When in electrical communication with the smart device 12, the electronic key 20 may be configured to transfer both data and power to the merchandise security device 16.

Figure 4:
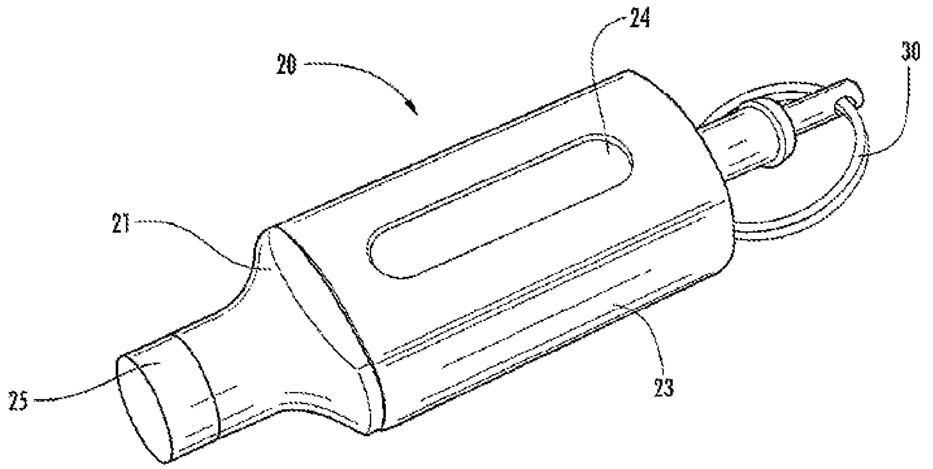
FIG. 4 is a perspective view of an electronic key according to one embodiment of the present invention.
Figure 5:
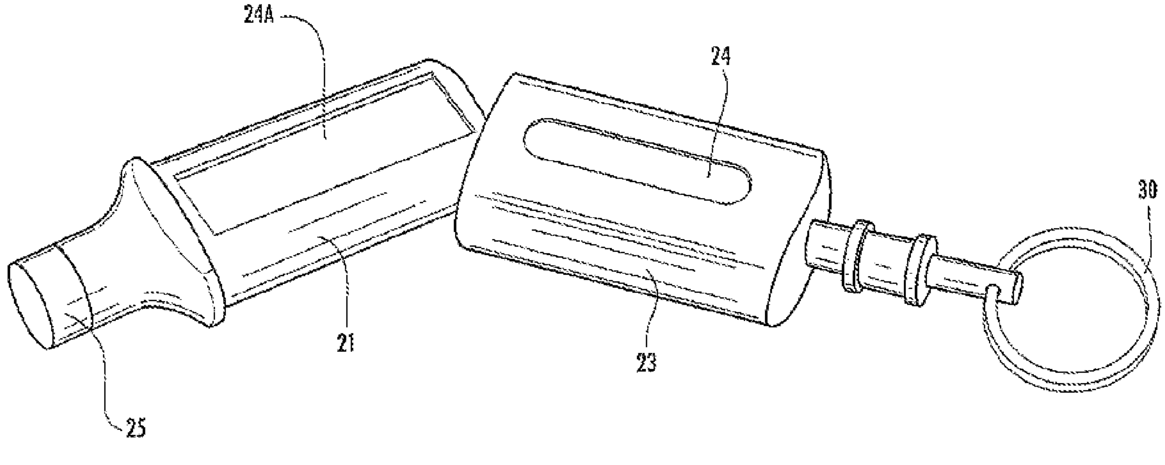
FIG. 5 is a partially disassembled view of the electronic key shown in FIG. 4.
Figure 6A:
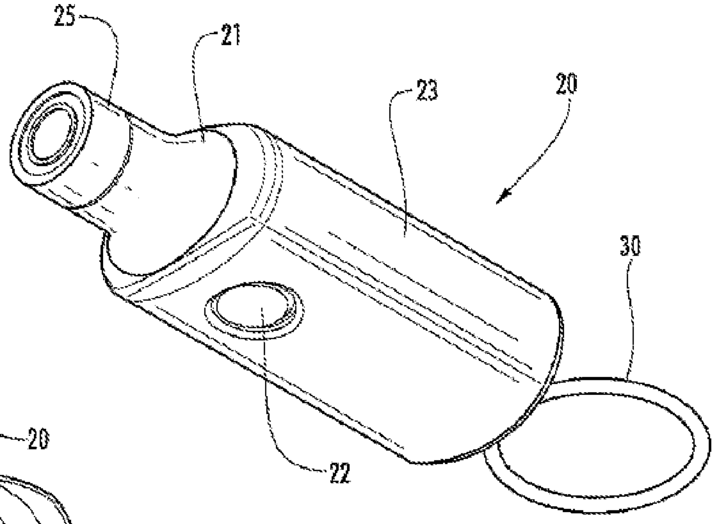
FIG. 6A is another perspective view of the electronic key shown in FIG. 4.
Figure 6B:
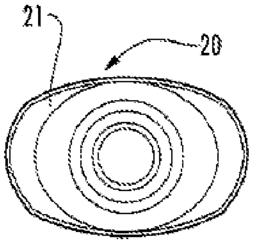
FIG. 6B is an end view of the electronic key shown in FIG. 4.

As illustrated in FIG. 4, the electronic key 20 comprises a housing 21 and an outer sleeve 23 that is removably disposed on the housing. The housing 21 contains the internal components of the key 20, including without limitation, the logic control circuit, memory, battery and communication system, as will be described. A window 24 may be formed through the outer sleeve 23 for viewing indicia 24A that uniquely identifies the key 20, or alternatively, indicates a particular item of merchandise, a specific merchandise security device, or a display area within a retail store for use with the key. The outer sleeve 23 is removably disposed on the housing 21 so that the indicia 24A may be altered or removed and replaced with different indicia. The electronic key 20 may further comprise a detachable "quick-release" type key chain ring 30. An opening 26 is formed through the outer sleeve 23 and a key chain ring port 28 is formed in the housing 21 for receiving the key chain ring 30. The electronic key 20 further comprises a transfer probe 25 located at an end of the housing 21 opposite the key chain ring port 28 for transferring data and/or power to the merchandise security device 40, as previously described. The transfer probe 25 may also transmit and receive the handshake communication protocol and the SDC from a programming station and may receive power from a charging station.

Figure 7:
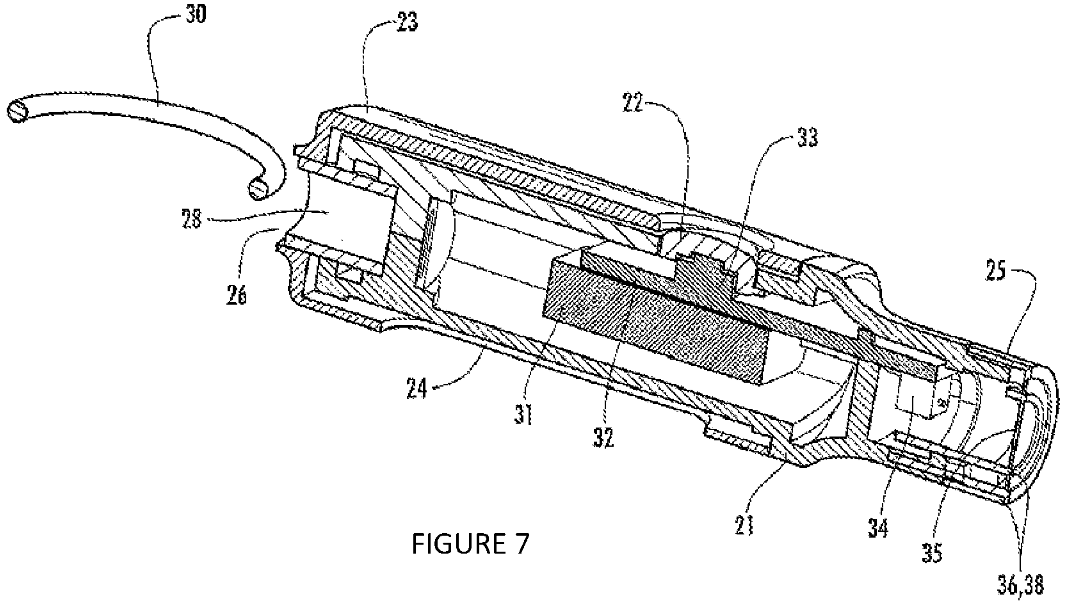
FIG. 7 is a cross-sectional view of the electronic key shown in FIG. 4.
Figure 8:
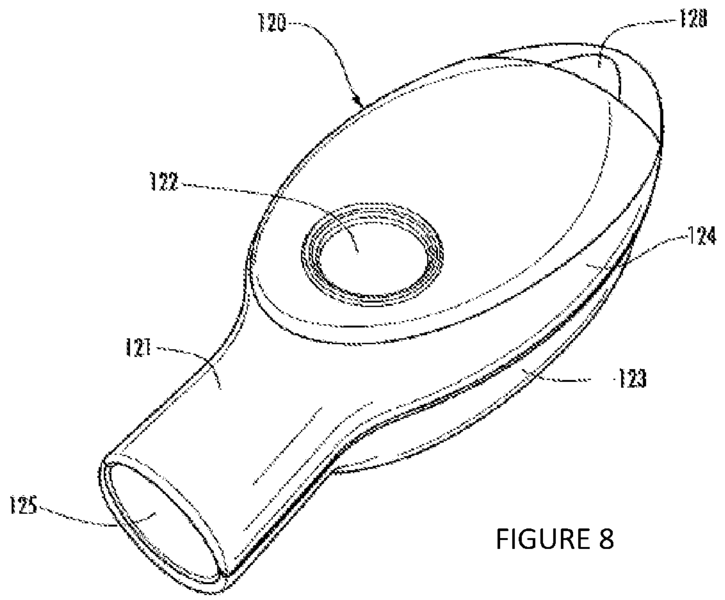
FIG. 8 is a perspective view of an electronic key according to another embodiment of the present invention.

As best shown in FIG. 7, a logic control circuit or printed circuit board (PCB) 32 are disposed within the housing 21 of the electronic key 20. The logic control circuit 32 is operatively coupled and electrically connected to a switch 33 that is actuated by the control button 22 provided on the exterior of the key 20 through the outer sleeve 23. Control button 22 in conjunction with switch 33 controls certain operations of the logic control circuit 32. For example, the logic control circuit 32 may be further operatively coupled and electrically connected to a communication system 34 for transmitting and receiving the handshake communication protocol and SDC data. In the embodiment shown and described herein, the communication system 34 is a wireless infrared (IR) transceiver for optical transmission of data between the electronic key 20 and the programming station, as well as between the key 20 and the merchandise security device. As a result, the transfer probe 25 of the key 20 is provided with an optically transparent or translucent filter window 35 for emitting and collecting optical transmissions between the key 20 and the programming station, or alternatively, between the key 20 and the merchandise security device, as required. Transfer probe 25 further comprises at least one bi-directional power transfer electrical contacts 36, 38 made of an electrically conductive material for transferring power to the merchandise security device. Accordingly, electrical contacts 36, 38 are electrically connected to the smart device and/or the battery 31, and are operatively coupled and electrically connected to logic control circuit 32 in any suitable manner, for example by conductive insulated wires or plated conductors.

According to one aspect of an electronic key 20, the key does not require a physical force to be exerted by a user on the key to operate the lock mechanism of the merchandise security device 16. By extension, no physical force is exerted by the key 20 on the lock mechanism. As a result, the key 20 cannot be unintentionally broken off in the lock, as often occurs with conventional mechanical key and lock mechanisms. Furthermore, neither the key 20 nor and the lock mechanism suffer from excessive wear as likewise often occurs with conventional mechanical key and lock mechanisms. In addition, there is no required orientation of the transfer probe 25 of the electronic key 20 relative to the transfer port 17 of the merchandise security device 16. Accordingly, any wear of the electrical contacts on the transfer probe 25, the transfer port is minimized. As a further advantage, an authorized person is not required to position the transfer probe 25 of the electronic key 20 in a particular angular orientation relative to the transfer port 17 of the merchandise security device 16 and thereafter exert a compressive and/or torsional force on the key to operate the mechanical lock mechanism of the device.

In another embodiment of a merchandise display security system, the system and method comprise an electronic key 120 with inductive transfer, and a merchandise security device 16 that is operated by the key. However, the electronic key 120 is useable with any security device 16 or locking device with inductive transfer capability that requires power transferred from the key to the device by induction, or alternatively, requires data transferred between the key and the device and power transferred from the key to the device by induction.

In one embodiment, the security device 16 comprises an internal lock mechanism. A transfer port may 17 be formed in the security device that is sized and shaped to receive a transfer probe of the electronic key 120. If desired, the transfer port 17 may comprise mechanical or magnetic means for properly positioning and securely retaining the key 120 within the transfer port. In one embodiment, it is only necessary that the inductive transceiver of the electronic key 120 is sufficiently aligned or proximate to the corresponding inductive transceiver of the security device 16 or proximate to the transfer port 17. Therefore, magnets are not required to position, retain and/or maintain electrical contacts provided on the electronic key 120 in electrical contact with corresponding electrical contacts provided on the security device 16. In the particular embodiment shown and described herein, data and/or power is transferred from the electronic key 120 to the security device by wireless communication, such as infrared (IR) optical transmission as discussed above. Power may be transferred from the electronic key 120 to the security device 16 by induction across the transfer port 17 of the security device 16 using an inductive transceiver disposed within a transfer probe of the key that is aligned with a corresponding inductive transceiver disposed within the security device. For example, the transfer probe of the electronic key 120 may comprise an inductive transceiver coil that is electrically connected to the logic control circuit of the key to provide electrical power from the internal battery of the electronic device or the smart device 12 to an inductive transceiver coil disposed within the security device 16. The inductive transceiver coil of the security device 16 may then transfer the electrical power from the internal battery of the electronic device or the smart device 12 to the lock mechanism disposed within the security device 16. Thus, the security device 16 may include at least one conductor configured as a coil having a plurality of continuous windings. As previously mentioned, the power transferred from the key 120 may be used to unlock the lock mechanism without the need for various other electrically powered mechanisms, for example, an electric motor, DC stepper motor, solenoid, or the like.

FIGS. 8-11 show an electronic key 120 with inductive transfer in greater detail. In one embodiment, the key 120 is configured to transfer both data and power to a merchandise security device 16. As noted above, the key 120 may utilize power provided by the smart device 12 or from an internal power source. In this example, the merchandise security device 16 may be a passive device in the sense that it does not have an internal power source sufficient to operate the mechanical lock mechanism of the merchandise security device. As a result of electrical communication between the smart device 12 and the electronic key 120, the electronic key may be configured to transfer both data and power to the merchandise security device 16.

The electronic key 120 comprises a housing having an internal cavity or compartment that contains the internal components of the key, including without limitation the logic control circuit, memory, communication system, and battery, as will be described. As previously mentioned, the electronic key 120 further comprises a transfer probe 125 located at an end of the housing opposite the opening for transferring data and/or power to the merchandise security device 16. The transfer probe 125 may also operable to transmit and receive the handshake communication protocol and the SDC from the programming station and to receive power from the charging station.

Figure 9:
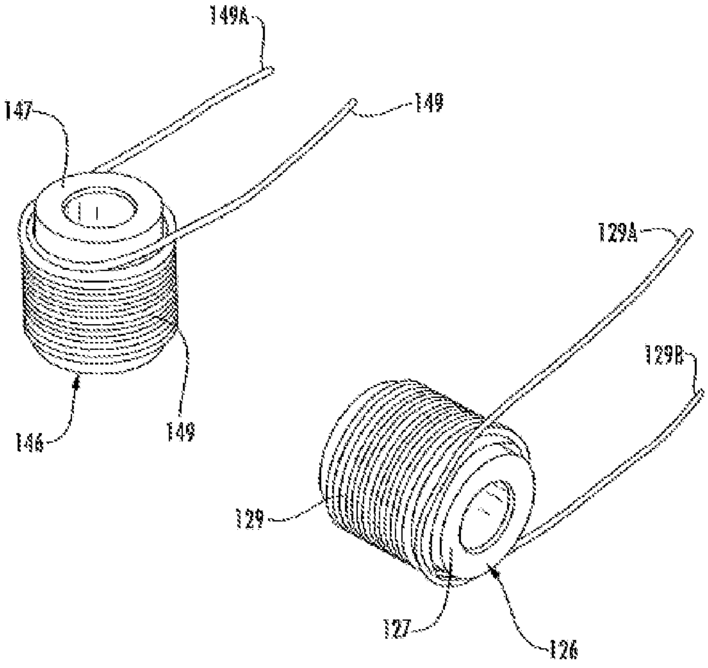
FIG. 9 is a perspective view of inductive coils of an electronic key and a merchandise security device, respectively, according to one embodiment of the present invention.
Figure 10A:
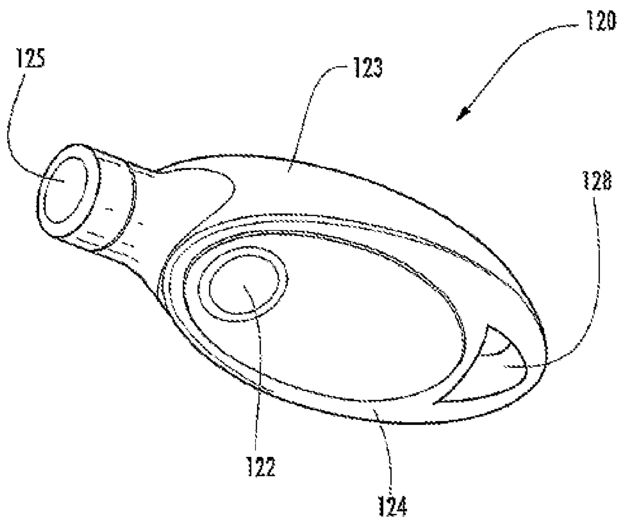
FIG. 10A is another perspective view of the electronic key shown in FIG. 8.
Figure 10B:
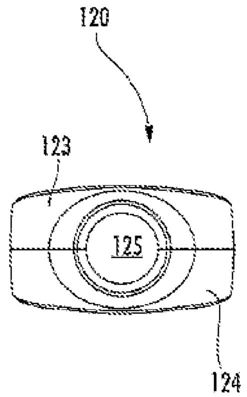
FIG. 10B is an end view of the electronic key shown in FIG. 8.

FIG. 9 shows an embodiment of an inductive coil 126 having high magnetic permeability that is adapted to be disposed within the housing of the electronic key adjacent the transfer probe. As shown herein, the inductive coil 126 comprises a highly magnetically permeable ferrite core 127 surrounded by a plurality of inductive core windings 129. The inductive core windings 129 consist of a length of a conductive wire that is wrapped around the ferrite core. Passing an alternating current through the conductive wire generates, or induces, a magnetic field around the inductive core 127. The alternating current in the inductive core windings 129 may be produced by connecting the leads 129A and 129B of the conductive wire to the internal battery 131 of the electronic key 120 through the logic control circuit. FIG. 9 further shows an inductive coil 146 having high magnetic permeability that is adapted to be disposed within the merchandise security device adjacent the transfer port. As shown herein, the inductive coil 146 comprises a highly magnetically permeable ferrite core 147 surrounded by a plurality of inductive core windings 149 consisting of a length of a conductive wire that is wrapped around the ferrite core. Placing the transfer probe 125 of the electronic key 120 into, or adjacent to, the transfer port 17 of the security device 16 and passing an alternating current through the inductive core windings 129 of the inductive core 126 generates a magnetic field within the transfer port of the security device in the vicinity of the inductive coil 146. As a result, an alternating current is generated, or induced, in the conductive wire of the inductive core windings 149 of inductive coil 146 having leads 149A and 149B connected to the logic control circuit of the security device. It is understood that the inductive coil 126 could alternatively be associated with the smart device such that the smart device is configured to communicate with inductive coil 146 of the merchandise security device.

Figure 11:
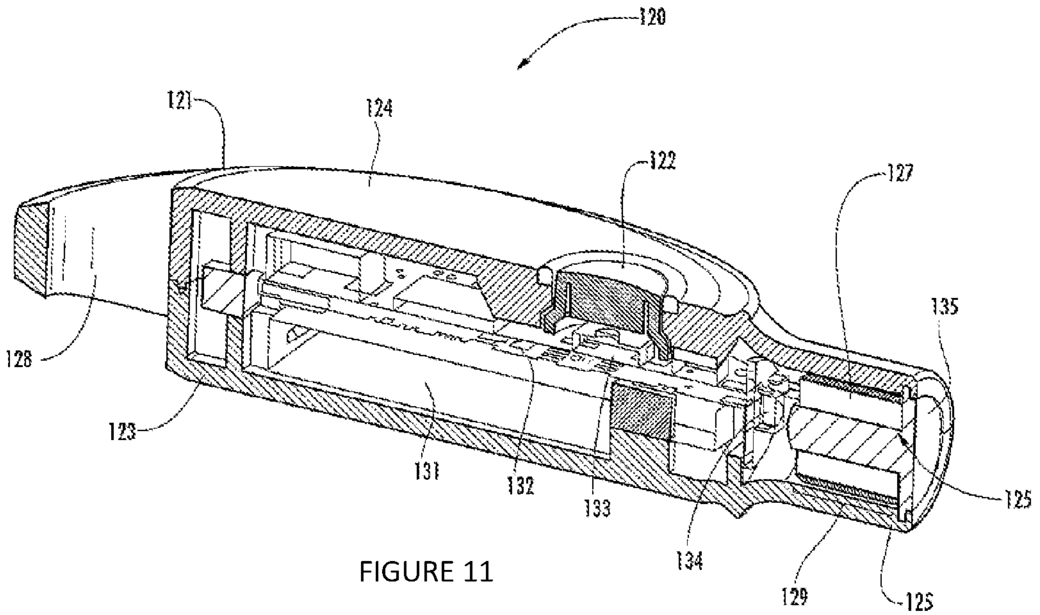
FIG. 11 is a cross-sectional view of the electronic key shown in FIG. 8.

In one embodiment, a logic control circuit or printed circuit board (PCB) 132 are disposed within the housing 121 of the electronic key 120 (see FIG. 11). The logic control circuit 132 is operatively coupled and electrically connected to a switch 133 that is actuated by the control button 122 provided on the exterior of the key 120 through the housing 121. Control button 122 in conjunction with switch 133 controls certain operations of the logic control circuit 132, and in particular, transmission of power between the key and the merchandise security device. In one embodiment, the logic control circuit 132 is further operatively coupled and electrically connected to a communication system 134 for transferring the handshake communication protocol and SDC data. As a result, the transfer probe 125 of the key 120 may be provided with an optically transparent or translucent filter window 135 for emitting and collecting optical transmissions between the key 120 and a programming station, or between the key and the merchandise security device 16, as required. Transfer probe 125 further includes an inductive coil 126 comprising inductive core 127 and inductive core windings 129 for transferring electrical power to the merchandise security device 16 and/or receiving electrical power from the key. Accordingly, the leads 129A and 129B of the inductive coil 126 are electrically connected to the logic control circuit 132, which in turn is electrically connected to the smart device and/or battery, in any suitable manner, for example by conductive insulated wires or plated conductors. Alternatively, the optical transceiver 134 may be eliminated and data transferred between the electronic key 120 and the merchandise security device via magnetic induction through the inductive coil 126.

The embodiments of an electrical key shown in connection with FIGS. 4-11 may be coupled to a smart device 12 using any suitable technique, such as those described above. In some embodiments, the electrical keys may be electrically coupled to a respective smart device 12 via a wired connection to an input port of the smart device. Thus, a cable may be electrically coupled and extend between the smart device 12 and the electronic key. Alternatively, the key may include a connector configured to directly engage an input port of the smart device for effectuating electrical communication. For example, the smart device may be electrically coupled to the electronic key 20 via a connector extending into opening 26 and the key chain ring port 28.

It is understood that any number of lock mechanisms may be employed in conjunction with various forms of power transfer for actuating a lock mechanism (e.g., inductive, capacitive, etc.) associated with the security device 16. For example, where a shape memory material is utilized, a change in shape of the shape memory material may cause mechanical actuation (e.g., linear and/or rotary movement) of the lock mechanism. The shape memory material may be operably engaged with a lock mechanism in any number of configurations to facilitate such actuation. Moreover, the shape memory material may be any suitable material, such as a metal, a polymer, or a combination thereof, that is configured to change in shape (e.g., length, area, etc.) in response to a current or a change in temperature. In addition, other mechanisms may be utilized for actuating a lock mechanism, including mechanical, electrical, and/or chemical state changes. As such, the security devices and associated lock mechanisms should not be limited in light of the illustrated embodiments.

In some embodiments, the security device and the electronic key are similar to those disclosed in U.S. Patent Publ. No. 2013/0081434, entitled Cabinet Lock for Use with Programmable Electronic Key and filed Sep. 28, 2012, U.S. Patent Publ. No. 2012/0047972, entitled Electronic Key for Merchandise Security Device and filed Aug. 31, 2011, and U.S. Patent Publ. No. 2011/0254661, entitled Programmable Security System and Method for Protecting Merchandise and filed Jun. 27, 2011, each of which is incorporated herein by reference in its entirety. In other embodiments, the security device and the electronic key are similar to those manufactured by InVue Security Products Inc., including Display Security products, Plunger Locks, Smart Locks, and IR2 and IR2-S Keys.

The foregoing has described one or more embodiments of a merchandise display security system for use with a smart device and an electronic key. Embodiments of a merchandise display security system have been shown and described herein for purposes of illustrating and enabling the best mode of the invention. Those of ordinary skill in the art, however, will readily understand and appreciate that numerous variations and modifications of the invention may be made without departing from the spirit and scope of the invention. Accordingly, all such variations and modifications are intended to be encompassed by the appended claims.

That which is claimed is:

1. A merchandise security system for protecting an item of merchandise from theft, comprising:

a smart device comprising a housing, a processor, a display, a power source, and wireless communication functionality;

an electronic key, independent of the smart device, comprising a power source; and a merchandise security device comprising a lock mechanism for preventing unauthorized access to a secure location, wherein the smart device is configured to communicate with the merchandise security device for operating the lock mechanism of the merchandise security device, wherein the smart device is configured to communicate with the electronic key for operating the electronic key, wherein the electronic key or the smart device is configured to transfer electrical power from the power source of the smart device or the electronic key to the merchandise security device for operating the lock mechanism of the merchandise security device and allowing access to the secure location.

2. The merchandise security system of claim 1, wherein the lock mechanism of the merchandise security device is configured to be unlocked via electrical power transferred from the electronic key.

3. The merchandise security system of claim 1, wherein the lock mechanism of the merchandise security device is configured to be unlocked via electrical power transferred from the smart device.

4. The merchandise security system of claim 1, wherein the merchandise security device is configured to be armed or disarmed via the smart device.

5. The merchandise security system of claim 1, wherein the smart device and the electronic key are each configured to time out after a predetermined period of time.

6. The merchandise security system of claim 1, wherein the merchandise security device does not include a power source.

7. The merchandise security system of claim 1, wherein the smart device comprises a cellular phone or a tablet.

8. The merchandise security system of claim 1, wherein the smart device is configured to wirelessly communicate with the merchandise security device.

9. The merchandise security system of claim 1, wherein the smart device is configured to communicate with the electronic key using NFC communication.

10. The merchandise security system of claim 1, wherein the smart device is configured to communicate with the merchandise security device using NFC communication.

11. The merchandise security system of claim 1, wherein the smart device is configured to operate the merchandise security device only when the smart device is authenticated.

12. The merchandise security system of claim 1, wherein the smart device comprises a software application configured to facilitate communication with the merchandise security device.

13. The merchandise security system of claim 1, wherein the smart device is not an electronic key.

14. The merchandise security system of claim 1, wherein the smart device is configured to communicate with the electronic key for authorizing the electronic key.

15. The merchandise security system of claim 1, wherein the smart device or the electronic key is configured to transfer power wirelessly to the merchandise security device for unlocking the lock mechanism.

16. The merchandise security system of claim 1, wherein the smart device is configured to communicate with the merchandise security device for unlocking the lock mechanism.

17. The merchandise security system of claim 1, wherein the merchandise security device comprises an NFC tag, and wherein the smart device is configured to communicate with the merchandise security device via the NFC tag.

18. The merchandise security system of claim 1, wherein the smart device is configured to communicate with the merchandise security device via Bluetooth communication.

19. The merchandise security system of claim 1, wherein the electronic key is not a smart device.

20. A method for protecting an item of merchandise susceptible to theft, comprising:

performing an authentication protocol between a smart device and a merchandise security device, the smart device comprising a housing, a processor, a display, a power source, and wireless communication functionality, the merchandise security device comprising a lock mechanism for preventing unauthorized access to a secure location;

communicating between the smart device and an electronic key for operating the electronic key, the electronic key being independent of the smart device;

unlocking the lock mechanism of the merchandise security device for allowing access to the secure location if the smart device is authorized based on the authentication protocol; and transferring electrical power from the power source of the smart device or the electronic key to the merchandise security device for operating the lock mechanism and allowing access to the secure location.

21. The method of claim 20, wherein transferring comprises transferring electrical power from the power source of the smart device to the merchandise security device for operating the lock mechanism and allowing access to the secure location.

22. The method of claim 20, wherein transferring comprises transferring electrical power from the power source of the electronic key to the merchandise security device for operating the lock mechanism and allowing access to the secure location.

* * * * *